United States Patent [19]
Stein

[11] Patent Number: 5,349,380
[45] Date of Patent: Sep. 20, 1994

[54] RESETTABLE CLAMP-SAMPLE-AND-HOLD SIGNAL PROCESSING CIRCUIT FOR IMAGING SENSORS

[75] Inventor: John T. Stein, Danbury, Conn.

[73] Assignee: Hughes Aircraft Company, Los Angeles, Calif.

[21] Appl. No.: 776,735

[22] Filed: Oct. 15, 1991

[51] Int. Cl.⁵ .............................. H04N 3/14
[52] U.S. Cl. .............................. 348/250; 348/241
[58] Field of Search ............... 358/167, 172, 213.15, 358/213.26, 213.19; 307/353, 542, 543

[56] References Cited

U.S. PATENT DOCUMENTS

| | | | |
|---|---|---|---|
| 3,781,574 | 12/1973 | White et al. | 307/353 |
| 4,004,157 | 1/1977 | Baertsch et al. | 307/353 |
| 4,289,975 | 9/1981 | Rolfe | 307/353 X |
| 4,551,761 | 11/1985 | Sase et al. | 358/213.15 |
| 4,562,475 | 12/1985 | Levine | 358/213.15 |
| 4,617,593 | 10/1986 | Dudley | 358/213.15 X |
| 4,637,036 | 1/1987 | Kobari | 375/101 X |
| 4,805,025 | 2/1989 | Akiyama et al. | 358/172 X |
| 4,809,074 | 2/1989 | Imaide et al. | 358/213.31 X |
| 5,144,444 | 9/1992 | MacLean | 358/213.15 X |

Primary Examiner—Victor R. Kostak
Attorney, Agent, or Firm—Michael W. Sales; Wanda K. Denson-Low

[57] ABSTRACT

A resettable clamp-sample-and-hold (RC-S/H) circuit includes a preamplifier 12 which buffers and scales a video imaging signal for an RC filter 17. Charge accumulated on the capacitor 16 of the RC filter 17 from previously recovered pixel voltage levels may be removed through a reset switch 18. The scaled video imaging signal may then propagate through a filter buffer 20, a clamp buffer 26 and a sample/hold buffer without the adverse effect of sequential pixel crosstalk.

17 Claims, 1 Drawing Sheet

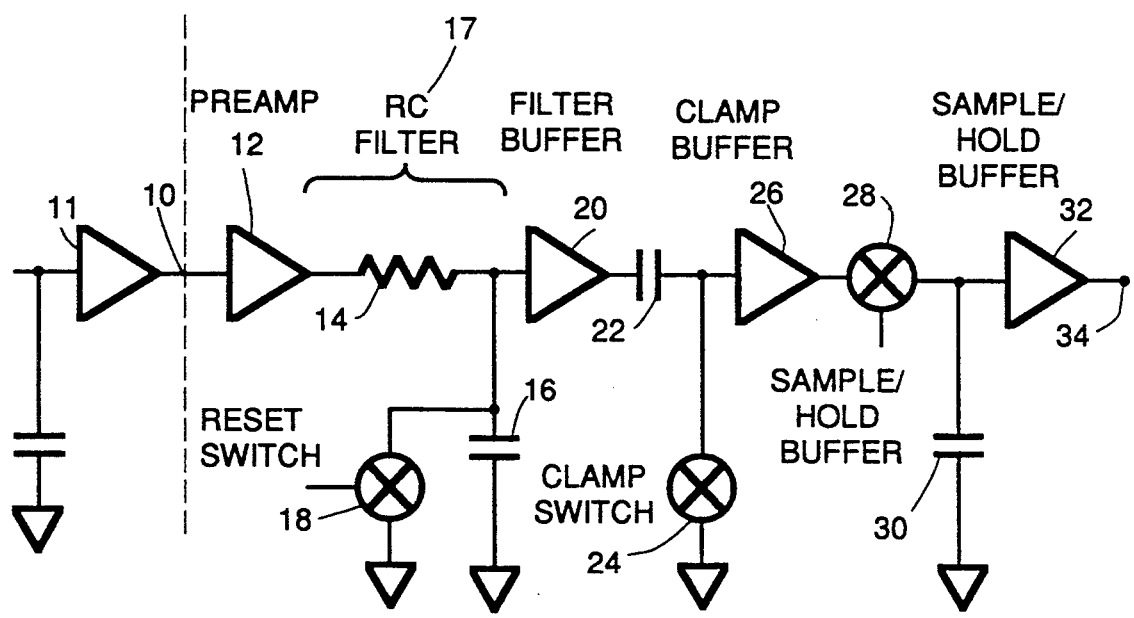
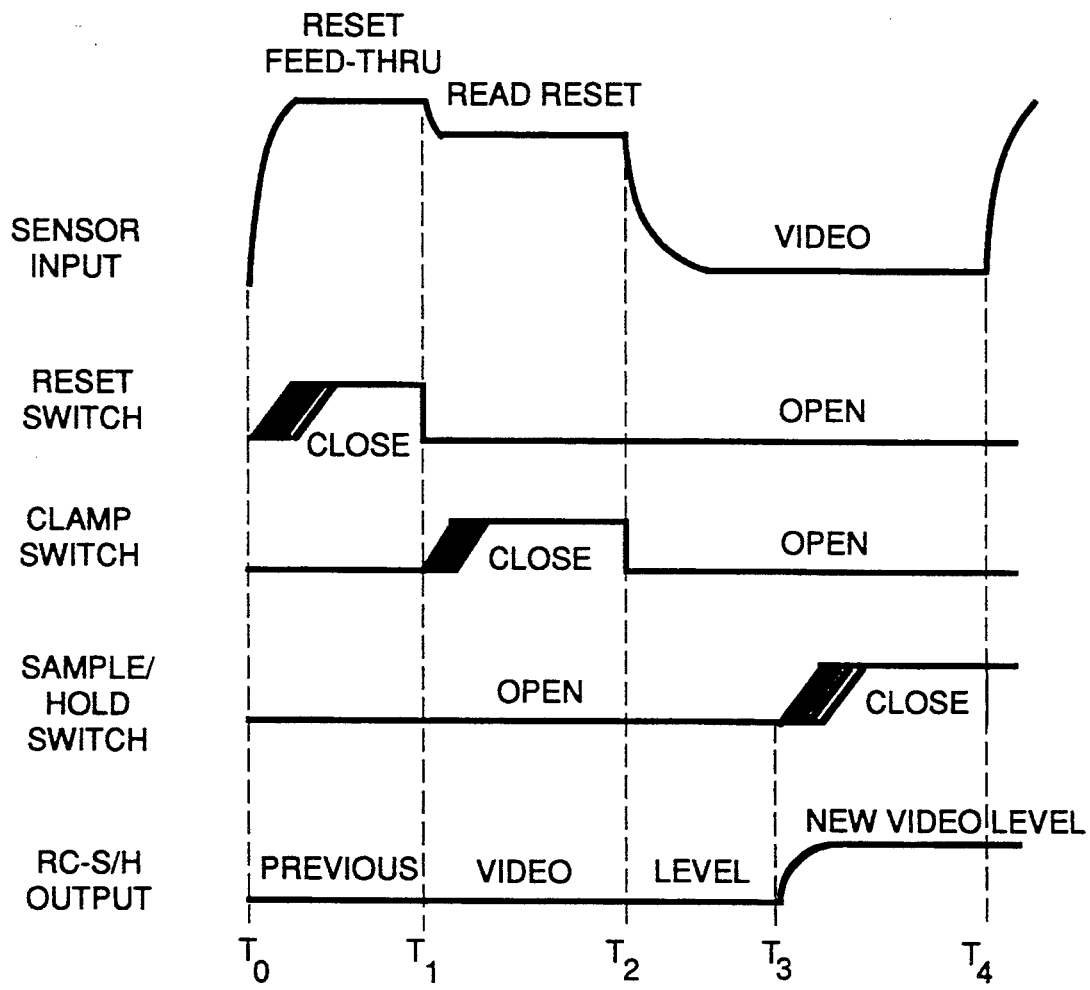
FIG. 1.
FIG. 2.

RESETTABLE CLAMP-SAMPLE-AND-HOLD SIGNAL PROCESSING CIRCUIT FOR IMAGING SENSORS

BACKGROUND OF THE INVENTION

1. Field of the Invention

The present invention relates to signal processors for imaging sensors of the type that employ clamp-sample-and-hold (C-S/H) circuits and, more particularly, a signal processor that employs a resettable C-S/H (RC-S/H) circuit that eliminates sequential pixel crosstalk while improving noise immunity.

2. Description of the Prior Art

A charge-coupled device (CCD), among other imaging sensors, may be used to generate video output signals corresponding to a particular sensed image. These video output signals must be recovered in a manner that preserves the characteristics of the image sensed by the CCD array. Heretofore, signal processing circuits have been used to recover the video signals generated by imaging sensors. Such signal processing circuits include the standard C-S/H correlated double sampling (CDS) processor, or more complex CDS processors such as the gated integrator. Problems associated with recovering video imaging signals include sequential pixel crosstalk and video output noise.

The C-S/H CDS design, which is the basis for the present invention, is a relatively simple circuit that utilizes a resistive and capacitive (RC) combination to filter video output noise from the true video signal. However, the bandwidth selected for the RC filter reflects a compromise between noise rejection and sequential pixel crosstalk. Hence, sub-optimal noise rejection performance is often the price paid for an acceptably low level of sequential pixel crosstalk.

The gated integrator and other more intricate types of CDS processors are inherently free of crosstalk between sequential video imaging pixels. However, the circuitry required to implement these designs is considerably more complex than that of the basic C-S/H processor. Therefore, these types of CDS processors are often deemed unacceptable for certain applications.

SUMMARY OF THE INVENTION

The present invention contemplates a signal processing circuit for recovering video imaging signals from a CCD or similar imaging sensor. This invention provides a unique modification to the standard C-S/H CDS processor by making the processing circuit resettable, thus a RC-S/H CDS signal processor.

The enhanced features of the RC-S/H signal processor are derived from a reset switch which has been added to the RC filter stage of the circuit. The reset switch functions to remove any residual charge from the RC filter stage that may have accumulated from the previously recovered pixel voltage level. This allows the RC filter to be optimally designed to suppress video output noise. Therefore, there is no longer a trade-off required between input noise rejection and sequential pixel crosstalk. Furthermore, this design is only slightly more complex than the basic C-S/H design.

A primary objective of the present invention is to provide a means for recovering accurate video voltage levels from a CCD sensor or other type of imaging sensor.

Another objective of the present invention is to provide a means of recovering accurate video imaging signals.

Another objective of the present invention is to provide a circuit that eliminates sequential pixel crosstalk while recovering video imaging signals.

Another objective of the present invention is to provide a circuit that provides optimal input noise rejection while recovering video imaging signals.

DESCRIPTION OF THE DRAWINGS

FIG. 1 is a circuit diagram of the RC-S/H CDS signal processing circuit.

FIG. 2 is a timing diagram illustrating an entire pixel read sequence of a RC-S/H CDS signal processing circuit.

DETAILED DESCRIPTION OF THE PRESENT INVENTION

A circuit diagram of a RC-S/H CDS signal processor for recovering video imaging signals is shown in FIG. 1. The present invention is a modification of the widely-used C-S/H CDS signal processor, with the modification being the addition of a reset switch 18 in the RC filter stage 17.

An input 10 to the RC-S/H CDS signal processor accepts a video imaging signal from a CCD or other type of imaging sensor represented by a buffer 11. The video signal is buffered and scaled by a preamplifier 12 and then provided to the RC filter stage 17. The RC filter stage 17 is comprised of a resistor 14 and a capacitor 16 that act to suppress any high-frequency noise which may propagate through the preamplifier The reset switch 18, when closed, removes from the capacitor 16 any residual charge that may be remaining from the previously recovered pixel. It is this action that limits the memory span of the RC-S/H CDS signal processor to a single pixel interval, thereby eliminating sequential pixel crosstalk.

In the absence of a reset switch, any residual charge which may have accumulated on the capacitor 16 would be slowly dissipated through the resistor 14 and the output impedance of the preamplifier 12, or through the input impedance of a filter buffer 20. As a result of this gradual charge dissipation the design of the RC filter must reflect a compromise between sequential pixel crosstalk and noise rejection. A wide filter bandwidth will yield adequate immunity to sequential pixel crosstalk but poor noise rejection, while a narrow filter bandwidth will provide good noise rejection but excessive sequential pixel crosstalk. The addition of the reset switch 18 allows the RC filter 17 to be designed solely for the purpose of optimal noise rejection rather than as a compromise between noise rejection and sequential pixel crosstalk suppression.

The remainder of the RC-S/H circuit functions as a standard C-S/H CDS signal processor. The filter buffer 20 allows the filtered video signal to propagate through to a clamp capacitor 22, which performs two functions, depending on the position of a clamp switch 24. When the clamp switch 24 is closed, the clamp capacitor 22 stores a direct current (DC) charge associated with a constant READ RESET portion of the video voltage signal that has propagated through the filter buffer 20. When the clamp switch 24 is open, the clamp capacitor 22 allows an active charge associated with a changing portion of the video voltage signal to propagate through to a clamp buffer 26. The output of the clamp buffer 26 represents this changing video signal less the stored DC voltage. A sample/hold switch 28, when closed, allows the output voltage of the clamp buffer 26 to be stored on a sample/hold capacitor 30. When the sample/hold switch 28 is open, the video voltage stored on the sample/hold capacitor 30 will be propagated through a sample/hold buffer 32 to the next signal processing stage. It should be noted that control of the reset switch 18, clamp switch 24, and sample/hold switch 28 is, in the preferred embodiment, derived directly from the time base generator of the imaging sensor.

Referring to FIG. 2, the timing of the RC-S/H CDS signal processing circuit during an entire pixel read sequence is illustrated. During the interval from time $T_O$ to $T_1$, the imaging sensor is being reset and the video signal at the input 10 to the signal processor is unsettled. The voltage level at this time is referred to as the RESET FEED-THRU voltage.

Also during the interval from time $T_O$ to $T_1$, the reset switch 18 is closed, thereby removing any residual charge from the capacitor 16 and prohibiting the RESET FEED-THRU voltage from propagating to the input of the filter buffer 20.

At time $T_1$, the input 10 from the imaging sensor has settled to the READ RESET voltage level. The READ RESET voltage level is used as a reference from which the actual video imaging output voltage level is determined. However, since the READ RESET voltage is not a constant, it may be looked upon as a floating reference. Also at time $T_1$, the reset switch 18 is opened permitting the READ RESET voltage to propagate through the filter buffer 20, and the clamp switch 24 is closed, storing the READ RESET voltage on the clamp capacitor 22.

At time $T_2$, the clamp switch 24 is opened, and the imaging sensor enters the VIDEO interval of the pixel period. During this interval, the output of the clamp buffer 26 will represent the changing video signal less the stored READ RESET reference voltage. This implicit subtraction totally rejects the imaging sensor reset noise which is correlated in both the READ RESET and VIDEO voltage levels.

At time $T_3$, the sample/hold switch 28 is closed, allowing the VIDEO voltage level to be stored on the sample/hold capacitor 30. At time $T_4$, after the VIDEO voltage has settled and been stored on the sample/hold capacitor 30, the sample/hold switch 28 is opened. The sample/hold buffer 32 will then provide this video imaging voltage to the next processing stage.

What is claimed is:

1. In a signal processor including a clamp-sample and hold circuit having an input stage having a RC filter, including a resistor and a capacitor for noise rejection, the improvement comprising:
    means, connected to said RC filter, for selectively discharging said capacitor prior to receiving a new signal for processing, whereby crosstalk from one signal to a subsequent signal is reduced.

2. A signal processor as described in claim 1, interconnected with an imaging device for processing sequential pixels of said image, whereby sequential pixel crosstalk is reduced.

3. A signal processor as described in claim 2, wherein the imaging device is a charge-coupled device.

4. A signal processor as described in claim 1, wherein the RC filter is designed for optimal noise rejection, while the crosstalk is controlled by said means.

5. A signal processor as described in claim 1, wherein the clamp-sample and hold circuit includes a filter buffer, a clamping stage and a sample and hold stage all connected in series.

6. A signal processing circuit, comprising:
    an RC filter, formed of a resistor and a capacitor, said RC filter having buffer means for receiving an input signal for processing;
    means, connected to said RC filter, for selectively discharging the capacitor of the RC filter prior to said filter receiving a new signal for processing;
    means, connected to said RC filter, for receiving a signal from the RC filter and for amplifying said signal;
    a clamping stage for receiving and clamping the signal from the buffer means and for providing an output signal; and
    a sample and hold stage for selectively sampling the output signal from the clamping stage and for providing an output, such that input noise is rejected by the RC filter and crosstalk between sequential signals is eliminated by the use of the selective discharging means.

7. A signal processing circuit as described in claim 6, further comprising a preamplifier connected to receive the signals to be processed and for providing an output to the RC filter.

8. A signal processing circuit as described in claim 6, wherein the clamping stage comprises:
    a capacitor and a clamp buffer serially connected between an output of the buffer means and an input of the sample and hold stage; and
    means for selectively grounding the connection between the capacitor and the clamp buffer.

9. A signal processing circuit as described in claim 6, wherein the sample and hold stage includes:
    a buffer for receiving the output of the clamping stage and for providing the output of the signal processing circuit;
    a capacitor connecting an input of the buffer to ground; and
    means, connected between the output of the clamping stage and the input of the sample and hold buffer, for selectively connecting the clamping stage to the sample and hold buffer.

10. A filter stage of a clamp sample and hold circuit for an imaging sensor, said sensor providing a video signal that indicates sequential pixel readouts, said filter stage comprising:
    means including a capacitance and resistance for removing noise from said video signal; and
    means for discharging said capacitance after pixel recovery.

11. The filter stage of claim 10, wherein said capacitance is discharged by said discharging means when said sensor is being reset.

12. A sensor system comprising imaging sensor means for providing a video signal that indicates sequential pixel readouts; and means for recovering said pixel readouts from said video signal, said recovering means including:
    filtering means including a capacitance and resistance for removing noise from said video signal, and discharging means for discharging said capacitance after pixel recovery,
    clamping means, responsive to an output of said filtering means, for clamping the filtered video signal, and sampling means, responsive to an output of said clamping means, for sampling and holding the clamped video signal.

13. The system of claim 12, wherein said filtering means is designed for optimal noise rejection.

14. The system of claim 13, wherein said imaging sensor means includes a charge coupled device and issues a reset signal when said charge coupled device is being reset, and wherein said capacitance is discharged by said discharging means in response to said reset signal.

15. The system of claim 14, wherein said discharging means includes a switch coupled across said capacitance, said switching being responsive to said reset signal.

16. The system of claim 12, wherein said filtering means includes an active filter having at least one operational amplifier, resistor and capacitor, and wherein said discharging means includes a switch coupled across said at least one capacitor.

17. The system of claim 16, wherein said imaging sensor means includes a charge coupled device and issues a reset signal when said charge coupled device is being reset, and wherein said switch is responsive to said reset signal.

* * * * *